(12) United States Patent
Sanjay

(10) Patent No.: US 7,562,364 B2
(45) Date of Patent: Jul. 14, 2009

(54) ADAPTIVE QUEUE SCHEDULING

(75) Inventor: Addicam V. Sanjay, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1283 days.

(21) Appl. No.: 10/748,767

(22) Filed: Dec. 30, 2003

(65) Prior Publication Data

US 2005/0149608 A1 Jul. 7, 2005

(51) Int. Cl.
*G06F 9/46* (2006.01)
*G06F 15/16* (2006.01)
*G06F 15/173* (2006.01)

(52) U.S. Cl. .................. 718/103; 709/207; 709/240; 718/102

(58) Field of Classification Search ............. 370/230, 370/235; 718/102, 103, 104, 105; 709/229, 709/240, 242, 207
See application file for complete search history.

(56) References Cited

U.S. PATENT DOCUMENTS

| | | | | | |
|---|---|---|---|---|---|
| 4,345,309 | A | * | 8/1982 | Arulpragasam et al. | 711/140 |
| 4,807,111 | A | * | 2/1989 | Cohen et al. | 710/54 |
| 5,287,346 | A | * | 2/1994 | Bianchini et al. | 370/390 |
| 5,574,933 | A | * | 11/1996 | Horst | 712/28 |
| 5,592,671 | A | * | 1/1997 | Hirayama | 718/104 |
| 5,815,659 | A | * | 9/1998 | Umetsu et al. | 709/203 |
| 6,185,613 | B1 | * | 2/2001 | Lawson et al. | 709/224 |
| 6,272,109 | B1 | * | 8/2001 | Pei et al. | 370/230 |
| 6,292,492 | B1 | * | 9/2001 | Bonomi et al. | 370/415 |
| 6,615,223 | B1 | * | 9/2003 | Shih et al. | 707/201 |
| 6,940,814 | B1 | * | 9/2005 | Hoffman | 370/235 |
| 7,164,678 | B2 | * | 1/2007 | Connor | 370/392 |
| 7,185,003 | B2 | * | 2/2007 | Bayliss et al. | 707/3 |
| 2003/0063562 | A1 | * | 4/2003 | Sarkinen et al. | 370/230 |
| 2003/0112817 | A1 | * | 6/2003 | Woo et al. | 370/413 |
| 2003/0133457 | A1 | * | 7/2003 | Ono et al. | 370/395.4 |
| 2004/0010612 | A1 | * | 1/2004 | Pandya | 709/230 |
| 2004/0085977 | A1 | * | 5/2004 | Gaur | 370/412 |

* cited by examiner

*Primary Examiner*—Meng-Ai An
*Assistant Examiner*—Caroline Arcos
(74) *Attorney, Agent, or Firm*—Blakely, Sokoloff, Taylor & Zafman LLP

(57) ABSTRACT

According to an embodiment of the invention, a method and apparatus for adaptive queue scheduling. An embodiment of a method comprises receiving packets of data in a first queue, each of the packets having one of a plurality of priorities, the plurality of priorities including a first priority and a second priority; copying a first plurality of packets from the first queue to a second queue; scheduling a first subset of packets from the second queue; and determining whether the second queue includes a packet with the first priority. If the second queue includes a packet with a first priority, scheduling a second subset of packets from the second queue; and if the second queue does not include a packet with the first priority, copying a second plurality of packets from the first queue to the second queue.

18 Claims, 6 Drawing Sheets

ADAPTIVE QUEUE SCHEDULING

BACKGROUND

In computer operations, scheduling of tasks can greatly affect system performance. For example, if multiple tasks are pending and such tasks have varying priorities, then scheduling is intended to attend to each of the multiple tasks while also addressing the priorities of the tasks.

Scheduling may be implemented in many different ways. In one example, round robin scheduling provides that tasks are ordered according to their priorities and then sent to a device driver in groups or sets based on such priorities. The groups or sets may contain more of the higher priority packets, providing for weighted round robin scheduling.

However, conventional scheduling algorithms may schedule certain tasks ahead of higher priority tasks because of the structure of the operation. In conventional round robin scheduling, weighted round robin scheduling, or similar processes packets may continue to be scheduled from a queue after there are no more high priority packets remaining in the queue. Because of this, lower priority packets may be scheduled even though higher priority packets may have been received.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and apparatus are described for adaptive queue scheduling.

Before describing an exemplary environment in which various embodiments of the present invention may be implemented, certain terms that will be used in this application will be briefly defined:

As used herein, "packet" means a unit or set of data. A packet may, for example, represent a task, instruction, or set of instructions.

As used herein, "round robin scheduling" means a scheduling algorithm or method in which processes are scheduled in a circular or alternating pattern from various sources. The term includes scheduling in which tasks are scheduled alternately from multiple different priority levels.

As used herein, "weighted round robin scheduling" means round robin scheduling in which the scheduling of processes is weighted on some basis. The term includes round robin scheduling in which the number of tasks scheduled is weighted based upon the priority of each task.

Under an embodiment of the invention, adaptive queue scheduling is provided. In one embodiment, a scheduling algorithm includes scheduling tasks from various sources or queues. If there are no more tasks available from one or more sources or queues, the scheduling is paused, additional tasks are obtained, and the scheduling is then resumed.

According to one embodiment of the invention, a system utilizes round robin scheduling or a similar scheduling algorithm. The algorithm schedules tasks from multiple queues (or sub-queues within a queue), with each queue representing a particular priority level or levels. If it is determined that there are no more tasks in the highest priority queue, the algorithm pauses the scheduling process to obtain more tasks for scheduling and then resumes scheduling. A particular embodiment includes a delay process. In this embodiment, if a process obtains more tasks for scheduling and determines that there are no tasks in the highest priority queue, then a delay period is commenced. During the delay period, the process does not obtain more tasks when it is determined that there are no tasks in the highest priority queue. The delay period may provide a time period in which scheduling continues while time is allowed for more high priority tasks to arrive.

The examples provided herein show a determination whether there are any tasks with the highest priority level. Embodiments of the invention are not limited to these examples. Embodiments may also apply when a determination is made whether any tasks in a number of different priority levels, such as the two highest priority levels. Embodiments of the invention are not limited to processes in which tasks are assigned specific priority levels, and may be applied in any situation in which tasks have discernable characteristics or are received from different sources.

Figure 1:
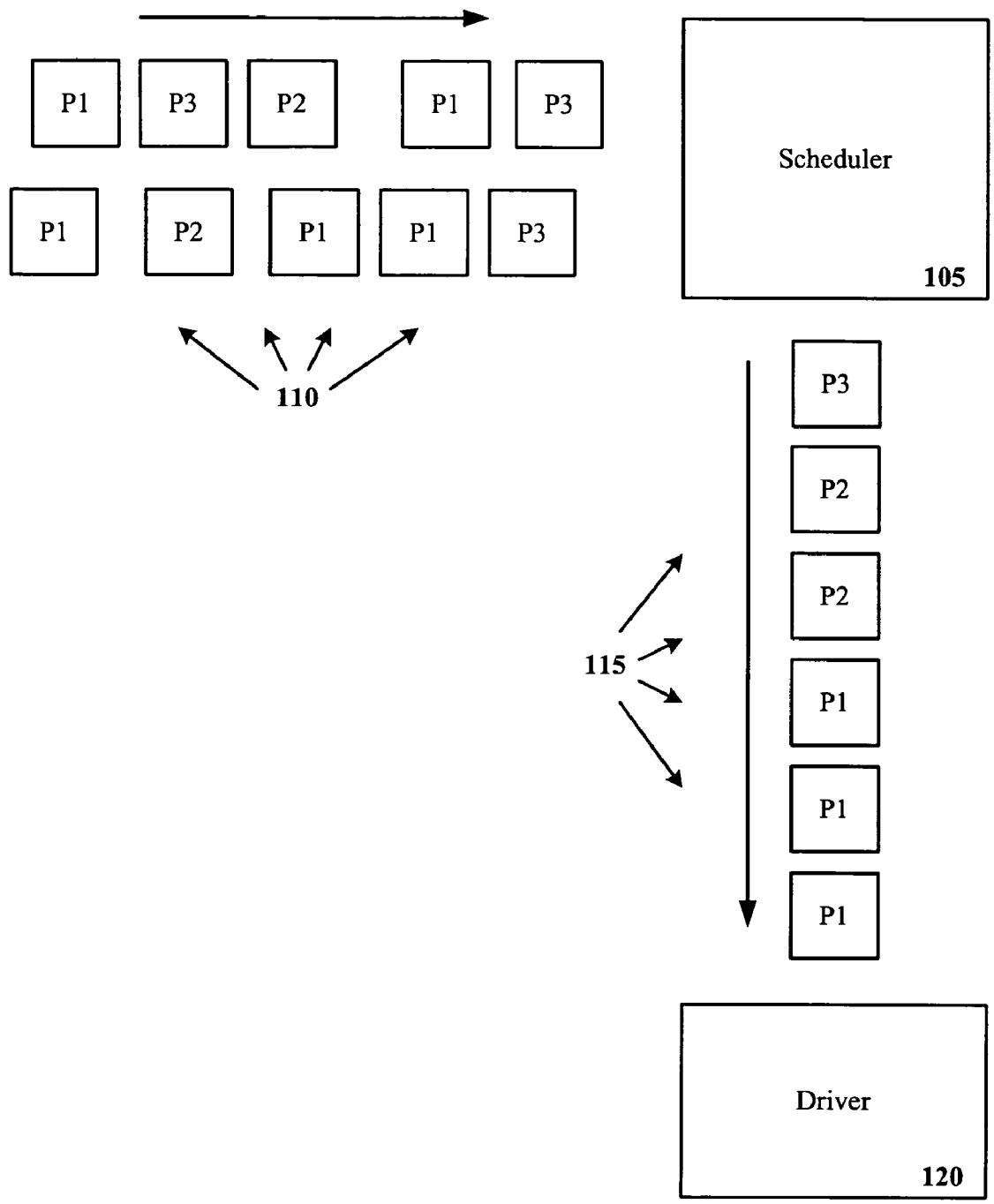
FIG. 1 illustrates an embodiment of scheduling prioritization.

FIG. 1 illustrates an embodiment of scheduling prioritization. In this illustration, a scheduler 105 is responsible for scheduling tasks to be provided to a unit, such as driver 120. The tasks are represented by packets of data. Received packets 110 are of varying priority levels. In the illustrated example, each packet has one of three different priority levels, but embodiments of the invention are not limited to any particular number or type of priority levels. As shown, a first, highest priority level is designated as P1. A second priority level that is of lower priority than P1 is P2. A third priority level that is of lower priority than P2 is P3.

The received packets 110 are scheduled by the scheduler utilizing the priority levels of the packets. In this illustration, a set of packets 115 is scheduled comprising three of the P1 priority packets, two of the P2 priority packets, and one of the P3 priority packets. The scheduling of the packets represents a weighted round robin scheduling in which sets of packets are scheduled, with the number of packets in each set being weighted according to the priorities of the packets. In scheduling, the scheduler 105 may run out of the highest priority packets (or out of one or more priority levels) in the packets being scheduled.

According to an embodiment of the invention, the scheduler 105 will proceed to obtain more packets when no more high priority packets, such as P1 packets, are available. In this embodiment, the scheduler 105 therefore may avoid scheduling lower priority packets when higher priority packets can be obtained for scheduling. According to a particular embodiment, scheduler determines whether any high priority packets are obtained after obtaining the additional packets and, if no high priority packets have been obtained, commences a delay period during which period the scheduler may continue to schedule the previously obtained packets without obtaining more packets.

Figure 2:
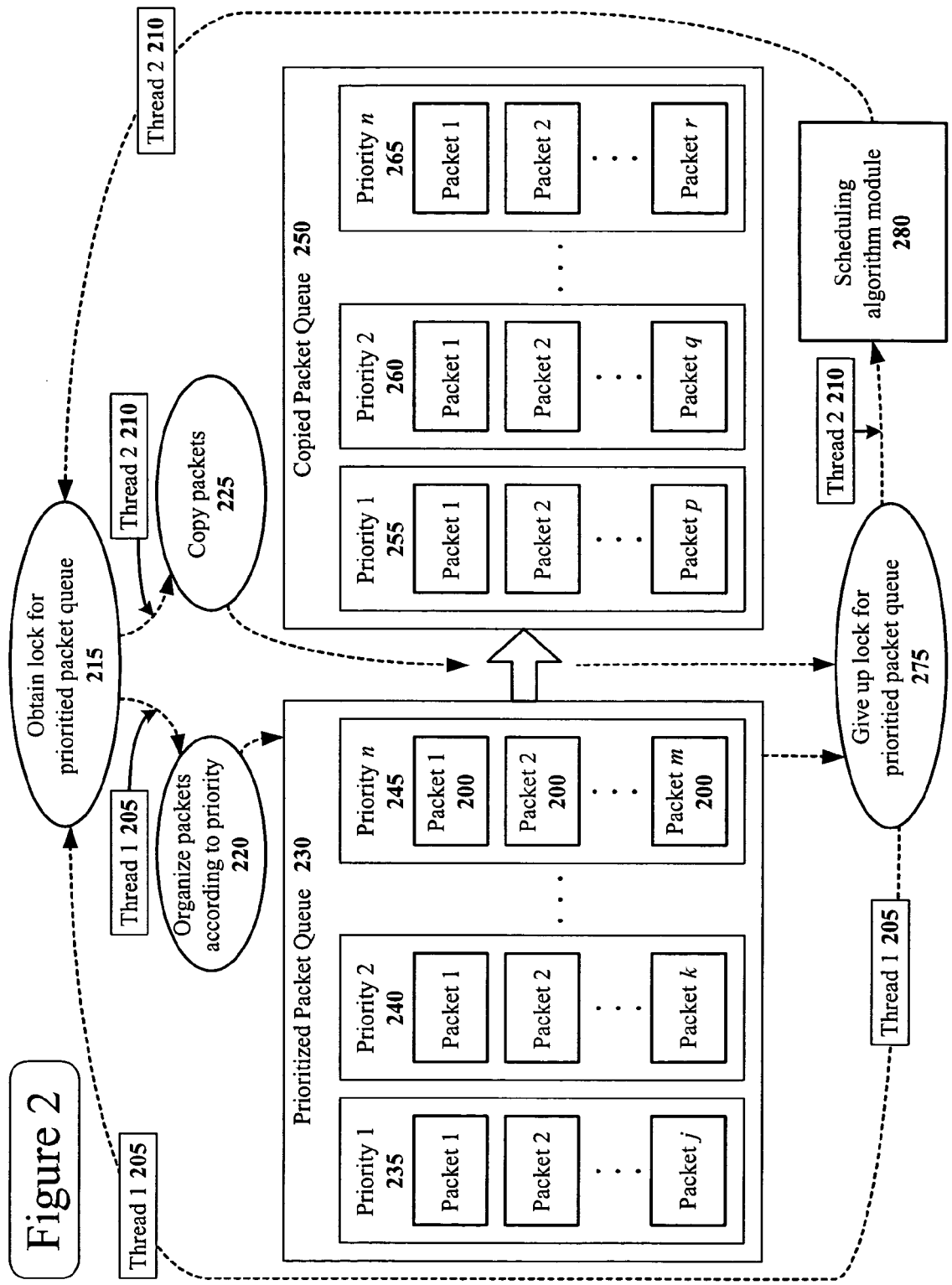
FIG. 2 illustrates an embodiment of queue formation for scheduling.

FIG. 2 illustrates an embodiment of queue formation for scheduling. In this illustration, the processes are described in terms of a first thread (thread 1 205) that relates to the formation of queues for received packets into a priority packet queue (first queue) 230 and a second thread (thread 2 210) that relates to copying packets from the priority packet queue into a copied packet queue (second queue) 250. Other embodiments may institute the processes in a different manner. While this description refers to ordering packets and copying packets, this may be understood to mean that pointers or other similar devices are used to reference the packets. The priority packet queue 230 and the copied packet queue 250 each comprise multiple individual queues of packets, which may be referred to as sub-queues. In this example, each individual sub-queue represents one of a number of different priority levels. This structure may vary in different embodiments of the invention. For example, one sub-queue may represent more than one different priority levels.

In thread 1 205, a lock is obtained on the priority packet queue 215 to prevent any other access to the queue while the operation is underway. Received packets are then separated into sub-queues based on the priorities of each packet. In this example, the priorities comprise a priority 1 235, a priority 2 240, and continuing through a priority n 245. Each priority queue may include a number of packets of such priority or may be empty if no packets of such priority are currently present. According to one embodiment of the invention, each sub-queue is organized according to the time such packet arrived or some other time factor. After the received packets have been organized into the priority packet queue 220, thread 1 205 provides for giving up the lock for the priority packet queue 275 to allow access by other operations. Thread 1 205 continues in this pattern as packets are received.

In thread 2 210, a lock is obtained on the priority packet queue 215 to prevent any other access to the queue while the operation is underway. The thread continues with copying any uncopied packets 225 from the priority packet queue 230 to a copied packet queue 250. As illustrated in FIG. 2, the copied packet queue 250 contains parallel priority sub-queues with the priority packet queue 230, these being priority 1 255, priority 2 260, and continuing through priority n 265. After copying any previously un-copied packets, thread 2 210 provides for giving up the lock for the priority packet queue 275 and operating the scheduling algorithm module 280.

Figure 3:
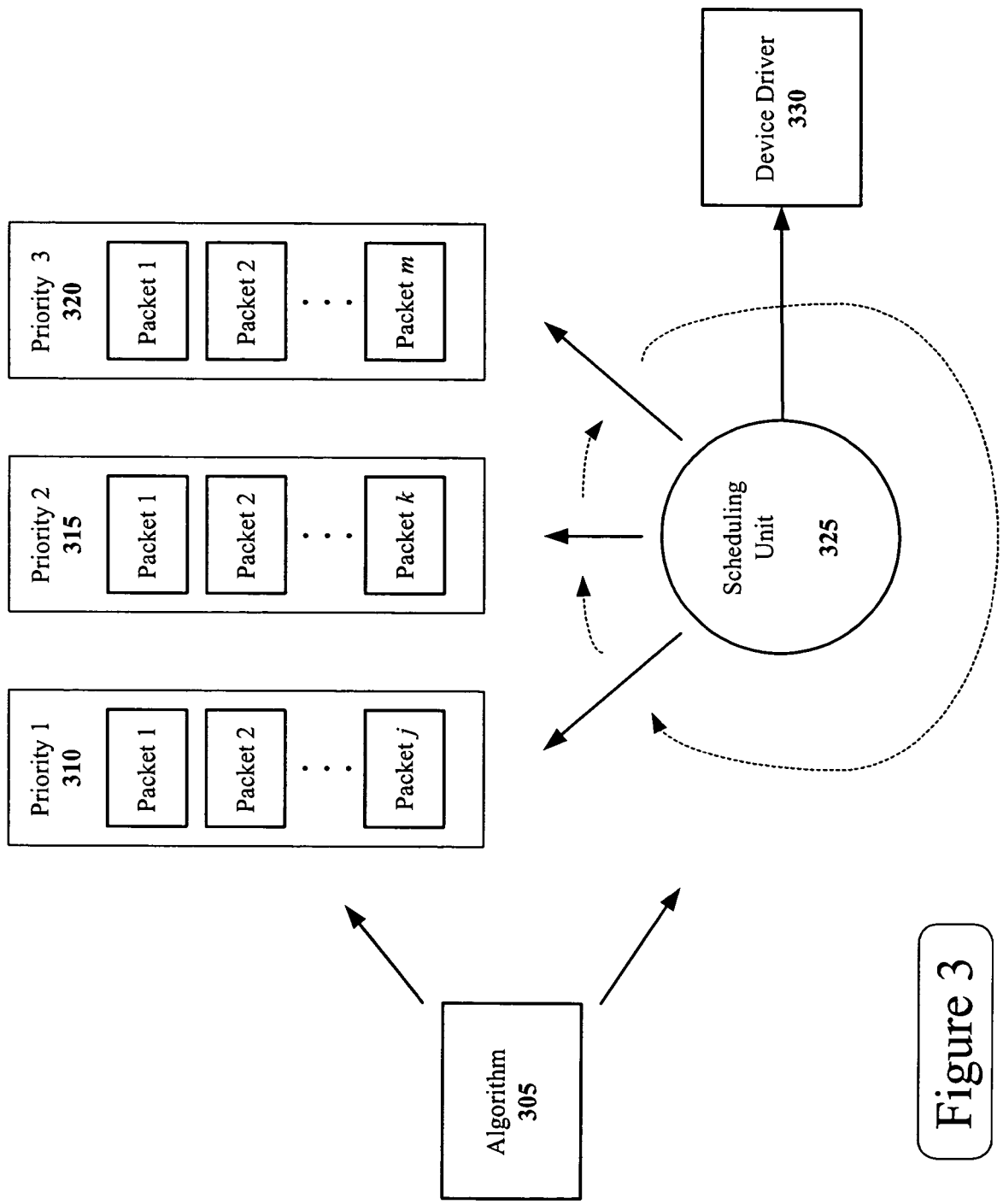
FIG. 3 illustrates an embodiment of round robin scheduling by a scheduler.

FIG. 3 illustrates an embodiment of round robin scheduling by a scheduler. In this illustration, an algorithm 305 controls a scheduling operation for packets that are to be provided to, for example, a device driver 330. The scheduling operation provides for scheduling of packets of multiple different priorities. The packets illustrated are in a priority 1 sub-queue 310, a priority 2 sub-queue 315, and a priority 3 sub-queue 320, although any number of priority levels and types may be present. To illustrate the round robin scheduling operation, a scheduling unit 325 takes one or more packets from priority 1 310, one or more packets from priority 2 315, and one or more packets from priority 3 320. The scheduling unit 325 then begins again with priority 1 310, as shown figuratively by the scheduling unit 325 rotating from each priority level to the next level.

In a weighted round robin scheduling operation, the number of packets scheduled for each priority is weighted based on the priorities of the packets. For example, three packets may be obtained from the priority 1 sub-queue 310, two packets may be obtained from the priority 2 sub-queue 315, and one packet may be obtained from the priority 1 sub-queue 320. The scheduled packets are provided to device driver 330. In the process of scheduling packets, the packets in the highest priority sub-queue, priority 1 sub-queue 310, may be exhausted. According to an embodiment of the invention, if the packets in the highest priority sub-queue are exhausted, the algorithm 305 provides for copying additional packets before scheduling is resumed. In another embodiment, if additional packets are copied and there are still no packets in the highest priority sub-queue 310, then a delay period may be commenced. The scheduling then will continue with the available packets without copying any more packets until the delay period has expired. While for simplicity this example only refers to exhausting the highest priority sub-queue, other embodiments might provide for copying packets if one or more different priority sub-queues are exhausted.

Figure 4:
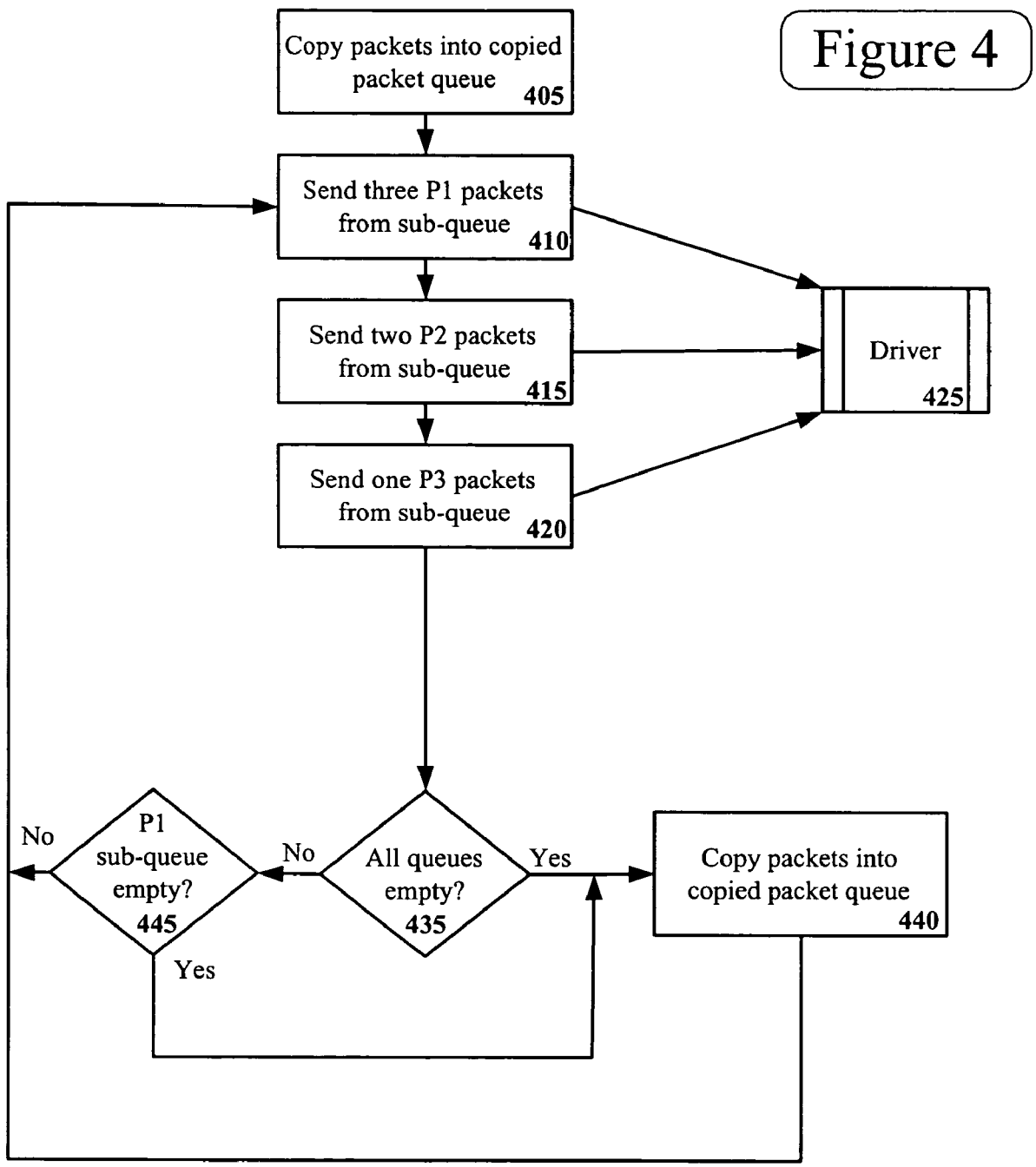
FIG. 4 is a flow chart of an embodiment of adaptive queue scheduling.

FIG. 4 is a flow chart of an embodiment of adaptive queue scheduling. In this illustration, received packets are copied into a copied packets queue (also referred to herein as the second queue) for scheduling 405. The copied packets queue includes packets arranged in a number of sub-queues, each sub-queue representing one of a number of different priorities. In this example, three priority levels (P1—high, P2—medium, P3 low) are provided, but any number and type of priority levels may be provided. To the degree that packets are available, a certain number of packets are scheduled from each priority level. In a weighted scheduling algorithm, the scheduling of the packets is weighted according to the priority levels of the packets. In this example, a driver 425 is sent a set of three P1 packets 410, two P2 packets 415, and one P3 packet 420 (if this number of packets is available for each priority level) in each scheduling action.

After a set of packets has been scheduled and sent, there is a determination whether all of the sub-queues are empty 435. If so, then there are no packets available for scheduling, and the process continues with copying received packets into the copied packets queue (second queue) 440. The process then returns to sending packets from each of the priority sub-queues 410-420. If all of the priority sub-queues are not empty 435, there is then a determination whether the high priority sub-queue P1 is empty 445. If the P1 sub-queue is not empty, then the process of scheduling packets from the priority sub-queues continues 410-420. However, if the P1 sub-queue is empty, then the process provides for copying received packets into the copied packets queue 440 and proceeding to the process of scheduling packets from the priority sub-queues continues 410-420. By copying such received packets, the process may avoid scheduling lower priority packets while higher priority packets are not addressed. While the illustrated operations in FIGS. 4 and 5 make a determination whether any of the highest priority (P1) packets are available in the queue, embodiments of the invention are not limited to this type of example. An embodiment may, for example, make a determination whether any packets of one or more different priority levels are available.

Figure 5:
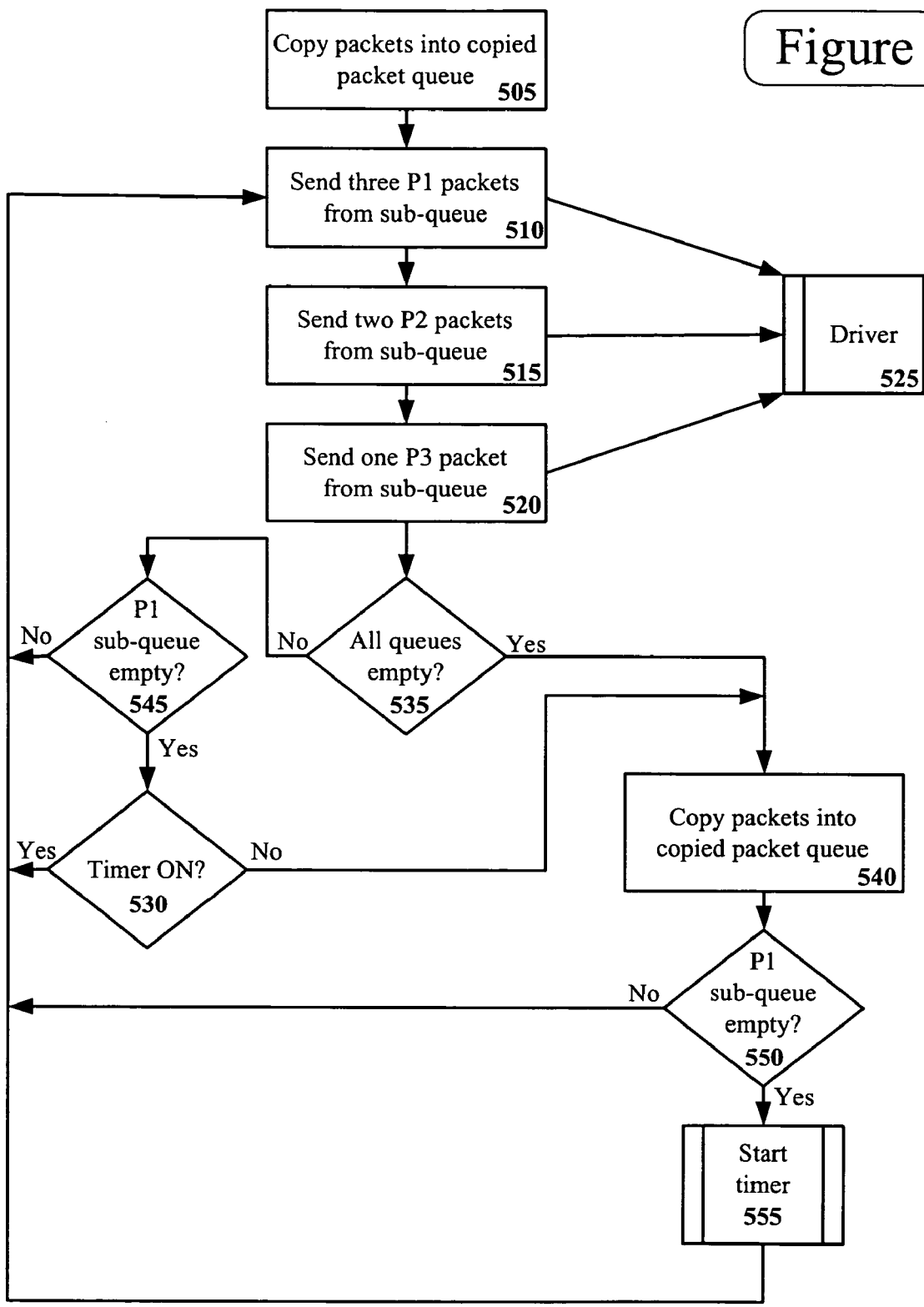
FIG. 5 is a flow chart of an embodiment of adaptive queue scheduling utilizing a timer.

FIG. 5 is a flow chart of an embodiment of adaptive queue scheduling utilizing a timer as a delay device. In this illustration, received packets are copied into a copied packets queue for scheduling 505. The copied packets queue includes packets arranged in a number of sub-queues, each sub-queue representing one of a number of different priorities. In this example, three priority levels (P1—high, P2—medium, P3 low) are again provided, but any number and type of priority levels may be provided. To the degree that packets are available, a certain number of packets are scheduled from each priority level. In this weighted scheduling algorithm, the scheduling of the packets is weighted according to the priority levels of the packets. A driver 525 is sent three P1 packets 510, two P2 packets 515, and one P3 packet 520 (if this number of packets is available for each priority level) in each scheduling action.

After this set of packets has been scheduled and sent, there is a determination whether all of the sub-queues are empty 535. If so, then there are no packets available for scheduling, and the process continues with copying received packets into the copied packets queue 540. There is a determination whether the P1 sub-queue remains empty 550. If so, then there presently are no high priority packets available for copying. A timer is set 555. The timer runs for a period of time, and during such period of time there are no attempts to copy received packets when it is determined that there are no high priority packets available. The timer providers a delay to allow the arrival of more high priority packets. While this example utilizes a timer to provide a delay period, this process can be provided by any delay process or mechanism that delays the copying of received packets. After setting the timer, the process then returns to sending packets from each of the priority queues 510-520. If all of the priority queues are not empty 535, there is then a determination whether the high priority queue P1 is empty 545. If the P1 queue is not empty, then the process of scheduling packets from the priority queues continues 510-520. If the P1 queue is empty, then there is a determination whether the timer is running (ON). If the timer is running, indicating that a delay period is currently active, then the process of scheduling packets from the priority queues continues 510-520. If the timer is no longer ON, indicating that any delay period has ended or expired, then the process provides for copying received packets into the copied packets queue 540 and then making a determination whether the P1 sub-queue remains empty 550.

Figure 6:
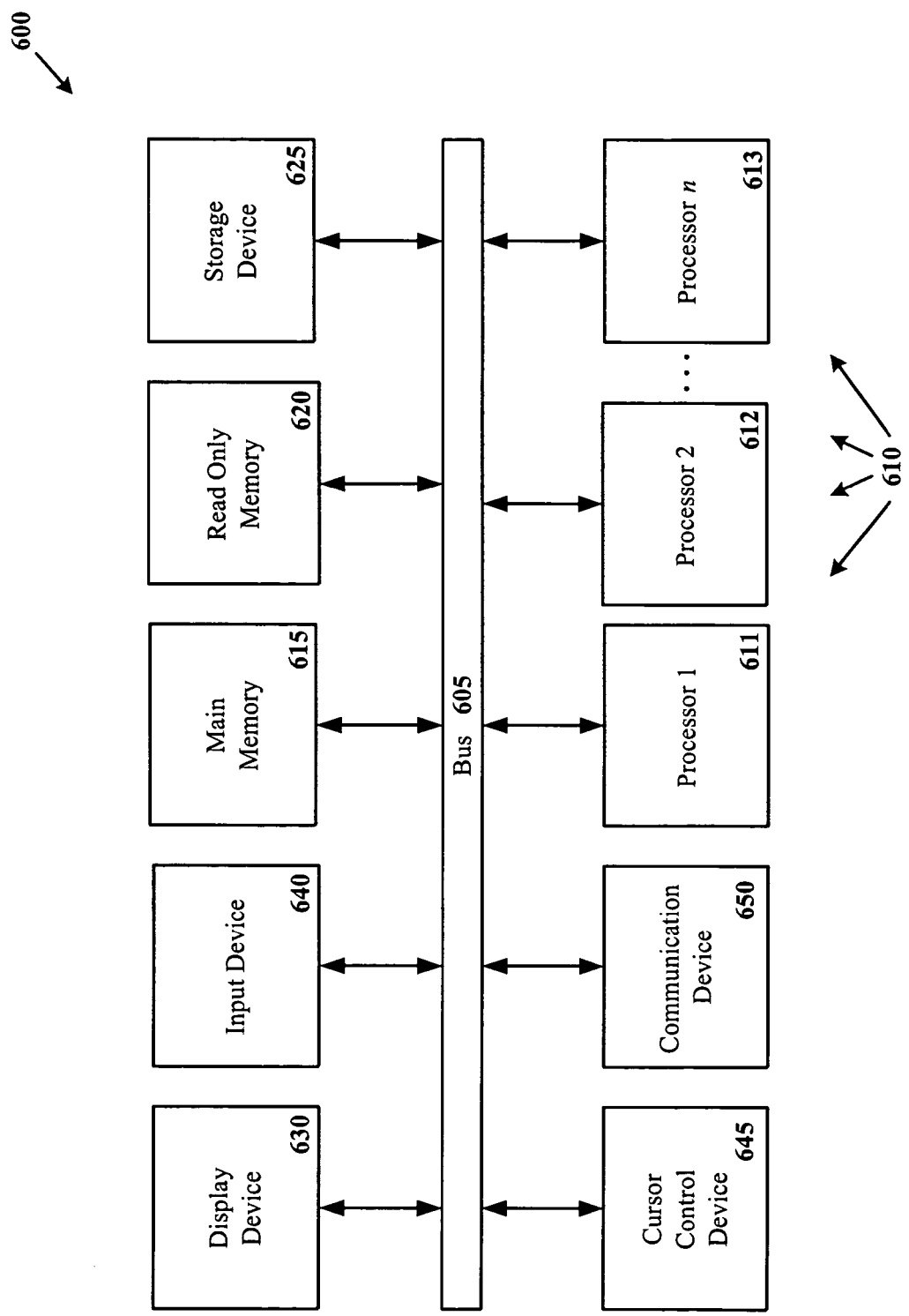
FIG. 6 illustrates an embodiment of a computer environment.

Techniques described here may be used in many different environments. FIG. 6 is block diagram of an embodiment of an exemplary computer. Under an embodiment of the invention, a computer 600 comprises a bus 605 or other communication means for communicating information, and a processing means such as one or more physical processors 610 (shown as 611, 612 and continuing through 613) coupled with the first bus 605 for processing information. Each of the physical processors may include multiple logical processors, and the logical processors may operate in parallel in the execution of drivers. Each processor may include an execution unit and logic for the operation of certain functions.

The computer 600 further comprises a random access memory (RAM) or other dynamic storage device as a main memory 615 for storing information and instructions to be executed by the processors 610. RAM memory may include dynamic random access memory (DRAM) and static dynamic random access memory (SRAM). Main memory 615 also may be used for storing temporary variables or other intermediate information during execution of instructions by the processors 610. Queues used in the scheduling of tasks may be implemented in the main memory 615. The computer 600 also may comprise a read only memory (ROM) 620 and/or other static storage device for storing static information and instructions for the processor 610.

A data storage device 625 may also be coupled to the bus 605 of the computer 600 for storing information and instructions. The data storage device 625 may include a magnetic disk or optical disc and its corresponding drive, flash memory or other nonvolatile memory, or other memory device. Such elements may be combined together or may be separate components, and utilize parts of other elements of the computer 600.

The computer 600 may also be coupled via the bus 605 to a display device 630, such as a liquid crystal display (LCD) or other display technology, for displaying information to an end user. In some environments, the display device may be a touch-screen that is also utilized as at least a part of an input device. In some environments, display device 630 may be or may include an auditory device, such as a speaker for providing auditory information. An input device 640 may be coupled to the bus 605 for communicating information and/or command selections to the processor 610. In various implementations, input device 640 may be a keyboard, a keypad, a touch-screen and stylus, a voice-activated system, or other input device, or combinations of such devices. Another type of user input device that may be included is a cursor control device 645, such as a mouse, a trackball, or cursor direction keys for communicating direction information and command selections to processor 610 and for controlling cursor movement on display device 630.

A communication device 650 may also be coupled to the bus 605. Depending upon the particular implementation, the communication device 650 may include a transceiver, a wireless modem, a network interface card, or other interface device. The computer 600 may be linked to a network or to other devices using the communication device 650, which may include links to the Internet, a local area network, or another environment.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon instructions, which may be used to program a computer (or other electronic devices) to perform a process according to the present invention. The computer-readable medium may include, but is not limited to, floppy diskettes, optical disks, CD-ROMs, and magneto-optical disks, ROMs, RAMs, EPROMs, EEPROMs, magnet or optical cards, flash memory, or other type of media/computer-readable medium suitable for storing electronic instructions.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A computerized method comprising:
receiving packets of data in a first queue, each of the packets having one of a plurality of priorities, the plurality of priorities including a first priority and a second priority, the first priority being higher than the second priority;
copying a first plurality of packets from the first queue to a second queue, the first queue and the second queue each containing a plurality of sub-queues, each of the plurality of sub-queues representing one of the plurality of priority levels, wherein each packet is placed in a sub-queue of the plurality of sub-queues that is associated with the priority level of the packet;
scheduling a first set of packets from the second queue, wherein the first set of packets includes one or more of packets of the first priority if the second queue contains packets of the first priority and one or more packets of the second priority if the second queue contains packets of the second priority, and wherein the number of packets in the set of packets for each priority are chosen using weighted round robin scheduling based on the priority of each packet;
providing the first set of packets from the second queue to a device driver;
determining whether after the first set of packets has been provided to the device driver, the second queue includes a packet with the first priority;
if the second queue includes a packet with a first priority after the first set of packets has been provided to the device driver, scheduling a second set of packets from the second queue using the weighted round robin scheduling, wherein the number of the packets scheduled is weighted based upon the priority of each packet; and
if the second queue does not include a packet with the first priority after the first set of packets has been provided to the device driver, pausing scheduling of packets from the second queue, and copying a second plurality of packets from the first queue to the second queue.

2. The method of claim 1, further comprising determining whether the second queue contains one or more packets of the first priority after copying the second plurality of packets from the first queue into the second queue.

3. The method of claim 2, further comprising commencing a delay period if there is a determination that the second queue does not contain one or more packets of the first priority after copying the second plurality of packets into the second queue.

4. The method of claim 3, wherein during the delay period the scheduling of packets from the second queue is to continue after the determination that there are no packets of the first priority in the second queue.

5. The method of claim 3, wherein said commencing the delay period comprises staffing a timer.

6. An apparatus comprising:
a processor to process data, the data including data packets for scheduling;
a memory, to include:
a first queue, the first queue to receive packets of data, each packet of data having one of a plurality of different priority levels, the plurality of different priority levels including a first priority and a second priority, the first priority being higher than the second priority, and
a second queue, the second queue to contain a first plurality of packets copied from the first queue , the first queue and the second queue each containing a plurality of sub-queues, each of the plurality of sub-queues representing one of the plurality of priority levels, wherein each packet is placed in a sub-queue of the plurality of sub-queues that is associated with the priority level of the packet; and
a scheduler, to schedule packets from the second queue; to copy packets from the first queue to the second queue and to schedule a first set of packets from the second queue, wherein the first set of packets includes one or more of packets of the first priority if the second queue contains packets of the first priority and one or more packets of the second priority if the second queue contains packets of the second priority, and wherein the number of packets in the set of packets for each priority are chosen using weighted round robin scheduling based on the priority of each packet;
the scheduler to provide the first set of packets to a device driver and to determine whether the second queue contains packets of the first priority after providing the first set of packets to the device driver, and, if the second queue includes one or more packets with the first priority after the first set of packets have been provided to the device driver, the scheduler to schedule a second set of packets from the second queue using the weighted round robin scheduling, wherein the number of the packets scheduled is weighted based upon the priority of each packet; and, if the second queue does not include a packet with the first priority after the first set of packets has been provided to the device driver, pausing scheduling of packets from the second queue, and the scheduler copies a second plurality of packets from the first queue to the second queue.

7. The scheduler of claim 6, wherein the scheduler is further to determine whether the second queue contains one or more packets of the first priority after copying the second plurality of packets into the second queue.

8. The scheduler of claim 6, further comprising a timer for a delay period, the scheduler to start the timer if the scheduler determines that the second queue does not contain the one or more packets of the first priority after copying the second plurality of packets into the second queue.

9. The scheduler of claim 8, wherein the scheduler is to continue scheduling packets while the timer is active.

10. A system comprising:
a memory;
a device driver to receive packets of data; and
a scheduler, the scheduler to receive data from the memory, the scheduler comprising:
a first queue, the first queue to receive packets of data, each packet of data having one of a plurality of different priority levels, the plurality of different priority levels including a first priority and a second priority, the first priority being higher than the second priority;
a second queue, the second queue to receive a first plurality of packets copied from the first queue, the first queue and the second queue each containing a plurality of sub-queues, each of the plurality of sub-queues representing one of the plurality of priority levels; wherein each packet is placed in a sub-queue of the plurality of sub-queues that is associated with the priority level of the packet; and a scheduling module, the scheduling module to schedule a first set of packets from the second queue, wherein the first set of packets includes one or more packets of the first priority if the second queue contains packets of the first priority and one or more packets of the second priority if the second queue contains packets of the second priority, and wherein the number of packets in the set of packets for each priority are chosen using weighted round robin scheduling based on the priority of each packet; and to provide the scheduled first set of packets to the device driver;

the scheduler to determine whether the second queue contains packets of the first priority after the first set of packets have been provided to the device driver, and, if the second queue includes one or more packets with the first priority after the first set of packets have been provided to the device driver, the scheduler to schedule a second set of packets from the second queue using the weighted round robin scheduling, wherein the number of the packets scheduled is weighted based upon the priority of each packet; and, if the second queue does not include a packet with the first priority after the first set of packets has been provided to the device driver, pausing scheduling of packets from the second queue, and the scheduler copies a second plurality of packets from the first queue to the second queue.

11. The system of claim 10, further comprising a processor and a bus, the processor and memory being coupled with the bus.

12. The system of claim 10, wherein the scheduler is further to determine whether the second queue contains one or more packets of the first priority after copying the second plurality of packets into the second queue.

13. The system of claim 12, further comprising a timer, the scheduler to start the timer if the second queue does not contain one or more packets of the first priority after copying the second plurality of packets into the second queue, the timer to run for a delay period.

14. The system of claim 13, wherein the scheduler is to continue scheduling packets from the second queue during the delay period.

15. A computer-readable storage medium having stored thereon data representing sequences of instructions that, when executed by a processor, cause the processor to perform operations comprising:

receiving packets of data in a first queue, each of the packets having one of a plurality of priorities, the plurality of priorities including a first priority and a second priority, the first priority being higher than the second priority;

copying a first plurality of packets from the first queue to a second queue, the first queue and the second queue each containing a plurality of sub-queues, each of the plurality of sub-queues representing one of the plurality of priority levels; wherein each packet is placed in a sub-queue of the plurality of sub-queues that is associated with the priority level of the packet;

scheduling a first set of packets from the second queue, wherein the first set of packets includes one or more of packets of the first priority if the second queue contains packets of the first priority and one or more packets of the second priority if the second queue contains packets of the second priority, and wherein the number of packets in the set of packets for each priority are chosen using weighted round robin scheduling based on the priority of each packet;

providing the first set of packets from the second queue to a device driver;

determining whether after the first set of packets have been provided to the device driver the second queue includes a packet with the first priority;

if the second queue includes a packet with a first priority after the first set of packets have been provided to the device driver, scheduling a second set of packets from the second queue using the weighted round robin scheduling; wherein the number of the packets scheduled is weighted based upon the priority of each packet; and if the second queue does not include a packet with the first priority after the first set of packets have been provided to the device driver, pausing scheduling of packets from the second queue and copying a second plurality of packets from the first queue to the second queue.

16. The medium of claim 15, further comprising instructions for determining whether the second queue contains one or more packets of the first priority after copying the second plurality of packets from the first queue into the second queue.

17. The medium of claim 16, further comprising instructions for commencing a delay period if there is a determination that the second queue does not contain one or more packets of the first priority after copying the second plurality of packets into the second queue.

18. The medium of claim 17, wherein during the delay period the scheduling of packets from the second queue is to continue after the determination that there are no packets of the first priority in the second queue.

* * * * *

UNITED STATES PATENT AND TRADEMARK OFFICE
CERTIFICATE OF CORRECTION

| | | |
|---|---|---|
| PATENT NO. | : 7,562,364 B2 | Page 1 of 1 |
| APPLICATION NO. | : 10/748767 | |
| DATED | : July 14, 2009 | |
| INVENTOR(S) | : Sanjay et al. | |

It is certified that error appears in the above-identified patent and that said Letters Patent is hereby corrected as shown below:

In column 7, at line 60 delete, "staffing" and insert -- starting --.

Signed and Sealed this

Twenty-eighth Day of September, 2010

David J. Kappos
*Director of the United States Patent and Trademark Office*